United States Patent Office 2,830,927
Patented Apr. 15, 1958

2,830,927

ORGANIC COMPOUND CONTAINING PHOSPHORUS AND HALOGEN, INSECTICIDAL COMPOSITIONS AND A METHOD OF DESTROYING INSECTS

Richard Sallmann, Binningen, Switzerland, assignor to Ciba Limited, Basel, Switzerland, a Swiss firm No Drawing. Application October 24, 1955
Serial No. 542,470

Claims priority, application Switzerland
September 25, 1951

11 Claims. (Cl. 167—22)

The present application is a continuation-in-part of my copending applications Serial No. 310,533 and No. 310,535, both filed September 19, 1952, both since abandoned.

According to this invention the new organic compound containing phosphorus and halogen which corresponds to the formula

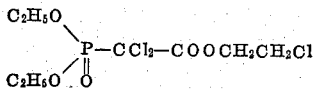

is made by reacting one molecular proportion of triethyl phosphite with one molecular proportion of trichloracetic acid β-chlorethyl ester. The new compound is a high boiling oil and can be used for combating pests. In addition to being a good contact insecticide it has an excellent so-called systemic action when applied to plants.

The condensation is carried out by reacting the components in equimolecular proportions accompanied by the splitting off of one molecular proportion of ethyl chloride. The reaction is exothermic so that the components are advantageously brought together while cooling and diluted with an inert solvent, such as benzene, toluene, ether, dioxane, hexane or low boiling benzine. In order to complete the reaction, the reaction mixture is advantageously heated to 80–120° C.

The compound of the invention is active against the various stages of development of the pests, such as eggs, larvae and imagines, so that it can be used as contact, stomach or respiratory poison.

It is capable of protecting a very wide variety of materials against pests, and gaseous, liquid or solid materials can be used as carriers for the active substance. As materials to be protected or used as carriers there come into consideration, for example, air, especially in rooms, and liquids such, for example, as water in ponds, and finally any inanimate or living solid substratum such, for example, as any objects in living rooms, cellars, plaster floors, stables, and also pelts, feathers, wool and the like, and also living organisms of the vegetable and animal kingdoms in their various stages of development, insofar as they are insensitive to the pest-combating agent.

The combating of pests may be carried out by the usual methods, for example, by treatment of the material to be protected with the compound in vapor form, for example, as fumigating agents or in the form of dusts or spraying liquors, for example, in the form of solutions or suspensions prepared with water or suitable organic solvents such, for example, as alcohol, petroleum, tar distillates or the like. There may also be used aqueous solutions or aqueous emulsions of organic solvents containing the active substance, for coating, spraying or impregnating the objects to be protected.

The spraying and dusting preparations may contain the usual inert fillers or identifying agents such, for example, as kaolin, gypsum or bentonite or other additions such as sulfite cellulose waste liquor, cellulose derivatives and the like. Furthermore, in order to improve the wetting or adhesive property the usual wetting agents or adhering agents may be added. The pest-combating preparations may be made in powdered form or in the form of aqueous dispersions or pastes or in the form of self-dispersing oils.

The compound may be present in the pest-combating preparations as the sole active substance or in combination with other insecticides and/or fungicides. The use of such preparations for plant protection is carried out by the usual spraying, dusting or fumigating methods.

The following examples illustrate the invention, the parts being by weight unless otherwise stated, and the relationship of parts by weight to parts by volume being the same as that of the kilogram to the liter.

Example 1

332 parts of triethyl phosphite are added gradually to a solution of 386 parts of trichloracetic acid β-chlorethyl ester in 600 parts by volume of benzene, the reaction being moderated by slight cooling. When the addition is complete, the mixture is heated for 3 hours under reflux. The benzene is then distilled off, and the residue is fractionated in a high vacuum. There are obtained 450 parts of a colorless oil which boils at 125–130° C. under 0.1 mm. pressure.

Example 2

A preparation for dormant spray is prepared as follows: 5 parts of the condensation product from triethyl phosphite and trichloracetic acid β-chlorethyl ester, 10 parts of the condensation product of 1 mol of tertiary octylphenol with 8 mols of ethylene oxide, 80 parts of spindle oil and 5 parts of oleic acid are mixed together to give a clear oily liquid which can be emulsified by pouring it into water.

By thoroughly spraying fruit trees in the spring shortly before bud-burst wtih a spraying liquor containing one percent of the above concentrated preparation, the overwintering eggs of aphides, winter moths (Cheimatobia), ermine moths (Hyponomenta), apple sucker (*Psylla mali*), and red spiders (Tetranychides) are killed. The treatment may be combined with a treatment with a copper preparation.

By the application of the aforementioned dormant spray the following insects can be combated:

*Anthonomus pomorum*, apple-blossom meevil
*Aphidinae*, aphids
*Argyresthia ephippella*, cherry-blossom moth
*Quadraspidiotus ostreaeformis*, European fruit scale
*Quadraspidiotus perniciosus*, San José scale
*Eulecanium corni*, European fruit lecanium
*Eriophyes piri*, pear leaf blister mite
*Eriosoma lanigerum*, woolly apple aphid
*Hyponomenta malinella et padella*, ermine moth
*Psylla mali*, apple sucker
*Tmetocera ocellana*, bud moth
*Argyroploce variegana*, bud moth

Example 3

2 parts of the condensation product from tri-ethyl phosphite and trichloracetic acid β-chlorethyl ester, 1 part of the condensation product of 1 mol dodecylmercaptan and 10 mols of ethylene oxide and 7 parts of diethylene glycol are mixed together.

The resulting preparation can be used, for example, for the destruction of aphides. The following comparative experiment was carried out, in which the action of this preparation was compared with that of nicotine.

Two areas at the edge of a potato field strongly attacked by aphides were sprayed, in one case, with a spraying liquor containing 0.2 percent of the above preparation (=0.4 percent of the active substance) and, in the other, with a spraying liquor containing 0.3 percent of a nicotine preparation of 20 percent strength (=0.6 percent of active substance). The recolonization of the treated areas by aphides from the untreated field was observed and the following results obtained.

The attack by aphides is expressed as a percentage of the degree of attack in the untreated part of the field.

|  | Preparation of the above Example | Nicotine Preparation |
| --- | --- | --- |
|  | Percent | Percent |
| Shortly after spraying | 0 | 0 |
| After 2 days | 0-3 | 50 |
| After 16 days | 0-3 | 100 |
| After 23 days | 100 | 100 |

This experiment clearly shows that the condensation product from triethyl phosphite and trichloracetic acid β-chlorethyl ester possesses systemic action.

By spraying fruit trees, asters, beans or sunflowers with a spraying liquor containing 0.1 percent of the active substance these plants can be freed from aphides.

Example 4

The preparation described in Example 3 is also active against Colorado beetles. When potato plants are sprayed with a spraying liquor of 0.2 percent strength (=0.4 percent of active substance) and the larvae of Colorado beetles are placed on the plants after 24 hours, the larvae are paralyzed after a further 24 hours and die after 48 hours.

Example 5

50 parts of the condensation product from triethylphosphite and trichloracetic acid β-chlorethyl ester, and 50 parts of the sodium salt of a petroleum sulfonic acid are mixed. There is obtained a spray concentrate which may be used for treatments during the summer season. By spraying fruit trees or other plants wtih a spraying liquor containing 0.02 percent of the active substance the following insects can be combated:

*Aspidiotus hederae,* oleander scale
*Quadraspidiotus ostreaeformis,* European fruit scale
*Quadraspidiotus perniciosus,* San José scale
*Lepidosaphes ulmi,* oystershell scale
*Carpocapsa pomonella,* codling moth
*Clysia ambiguella,* wine moth
*Polychrosis botrana,* wine moth
*Eriosoma lanigerum,* woolly apple aphid
*Heliothrips haemorrhoidalis,* greenhouse thrips
*Hopoclampaflava et minuta,* plum sanfly
*Hyphantria cunea,* fall webworm
*Hyponomenta malinella et padella,* ermine moth
*Pericerya purchasi,* cottony-cushion scale
*Phyllotreta atra,* flea bettle
*Pseudococcus citri,* citrus mealybug
*Psylla pyricola,* pear psylla
*Rhagoletis cerasi,* cherry fruit fly
*Stilpnotia salicis,* satin moth
*Trialeurodes vaporariorum,* greenhouse whitefly
*Tmetocera ocellana,* bud moth
*Argyroploce variegana,* bud moth
*Tetranychidae,* spider mites A spray concentrate can also be prepared by mixing 20 parts of the condensation product from triethylphosphite and trichloracetic acid β-chlorethyl ester, 10 parts of the condensation product of 1 mol of tertiary octylphenol and 8 mols of ethyleneoxide and 70 parts of isopropanol.

Example 6

1 part of the condensation product from triethylphosphite and trichloracetic acid β-chlorethylester are mixed with 99 parts of talcum. There is obtained a dusting powder which is very active against the house fly *Musca domestica.*

Example 7

2 parts of the condensation product from triethylphosphite and trichloracetic acid β-chlorethylester, 80 parts of sulphur and 18 parts of copperoxychloride are mixed. This is a dusting powder which acts as an insecticide and fungicide.

What is claimed is:

1. The organic compound containing phosphorus and halogen corresponding to the formula

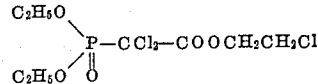

2. A pest combating preparation which contains at least one pesticidal adjuvant and in admixture therewith as an active ingredient the condensation product from triethylphosphite and trichloracetic acid β-chlorethylester which corresponds to the formula

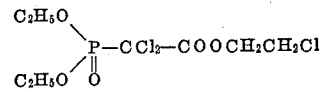

3. A pest combating preparation for dormant sprays consisting of 5 parts by weight of the condensation product from triethylphosphite and trichloracetic acid β-chlorethylester which corresponds to the formula

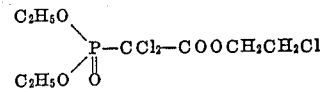

20 parts by weight of the condensation product of 1 mol of tertiary octylphenol with 8 mols ethyleneoxide, 5 parts by weight of oleic acid and 80 parts by weight of spindle oil.

4. A pest combating preparation consisting of 20 parts by weight of the condensation product from triethylphosphite and trichloracetic acid β-chlorethylester which corresponds to the formula

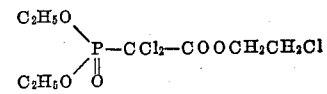

10 parts by weight of the condensation product of 1 mol of tertiary octylphenol with 8 mols ethyleneoxide and 70 parts by weight of isopropanol.

5. A pest combating preparation consisting of 50 parts by weight of the condensation product from triethylphosphite and trichloracetic acid β-chlorethylester which corresponds to the formula

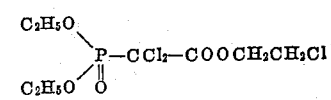

and 50 parts by weight of the sodium salt of petroleum sulfonic acid.

6. A pest combating preparation consisting of 1 percent of the condensation product from triethylphosphite and trichloracetic acid β-chlorethylester which corresponds to the formula

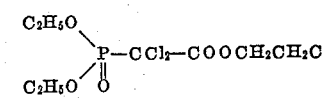

and 99 percent of talcum.

7. A method for combating insects which comprises treating the objects which are to be protected against the insects with an effective amount of a preparation according to claim 2.

8. A method for combating insects which comprises treating the objects which are to be protected against the insects with a spraying liquor containing an effective amount of a preparation according to claim 3.

9. A method for combating insects which comprises treating the objects which are to be protected against the insects with a spraying liquor containing an effective amount of a preparation according to claim 4.

10. A method for combating insects which comprises treating the objects which are to be protected against the insects with a spraying liquor containing an effective amount of a preparation according to claim 5.

11. A method for combating insects which comprises treating the objects which are to be protected against the insects with an effective amount of a preparation according to claim 6.

References Cited in the file of this patent

UNITED STATES PATENTS 2,599,761    Harman _____ June 16, 1952
2,701,225    Lorenz _____ Feb. 1, 1955